(12) United States Patent
Stobbe

(10) Patent No.: US 6,827,256 B2
(45) Date of Patent: Dec. 7, 2004

(54) SYSTEM FOR STORAGE AND OUTPUT OF OBJECTS

(75) Inventor: Anatoli Stobbe, Barsinghausen (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 0 days.

(21) Appl. No.: 10/098,274

(22) Filed: Mar. 15, 2002

(65) Prior Publication Data

US 2002/0130180 A1 Sep. 19, 2002

(30) Foreign Application Priority Data

Mar. 15, 2001 (DE) .......................................... 101 13 072

(51) Int. Cl.[7] .............................................. G06F 17/00
(52) U.S. Cl. ....................... 235/375; 235/381; 235/385; 340/570
(58) Field of Search ................................. 235/375, 385, 235/451, 381; 340/570, 572.1, 572.7

(56) References Cited

U.S. PATENT DOCUMENTS

| | | | | |
|---|---|---|---|---|
| 5,408,443 A | * | 4/1995 | Weinberger | .................. 368/10 |
| 5,745,036 A | * | 4/1998 | Clare | ....................... 340/572.1 |
| 6,131,808 A | | 10/2000 | Pires et al. | |
| 6,335,685 B1 | * | 1/2002 | Schrott et al. | ........... 340/572.1 |
| 6,407,665 B2 | * | 6/2002 | Maloney | .................. 340/568.1 |
| 6,427,913 B1 | * | 8/2002 | Maloney | ...................... 235/383 |
| 6,483,427 B1 | * | 11/2002 | Werb | ......................... 340/10.1 |
| 6,552,663 B2 | * | 4/2003 | Swartzel et al. | .......... 340/572.1 |

FOREIGN PATENT DOCUMENTS

| | | |
|---|---|---|
| DE | 198 56 763 | 6/2000 |
| EP | 0 732 278 | 9/1996 |

* cited by examiner

Primary Examiner—Karl D. Frech
Assistant Examiner—Daniel A. Hess
(74) Attorney, Agent, or Firm—Collard & Roe, P.C.

(57) ABSTRACT

A system is described for the identification, localization, storage and output of objets which carry electronically stored identity information. The system comprises at least one storage container with a reading device for reading the identity information, a display device for displaying the presence, position, or absence of the objects and an output device for releasing the objects which are stored inaccessibly or blocked. The electronically stored identity information can be read wirelessly by the reading device via a transponder located in the respective object.

18 Claims, 2 Drawing Sheets

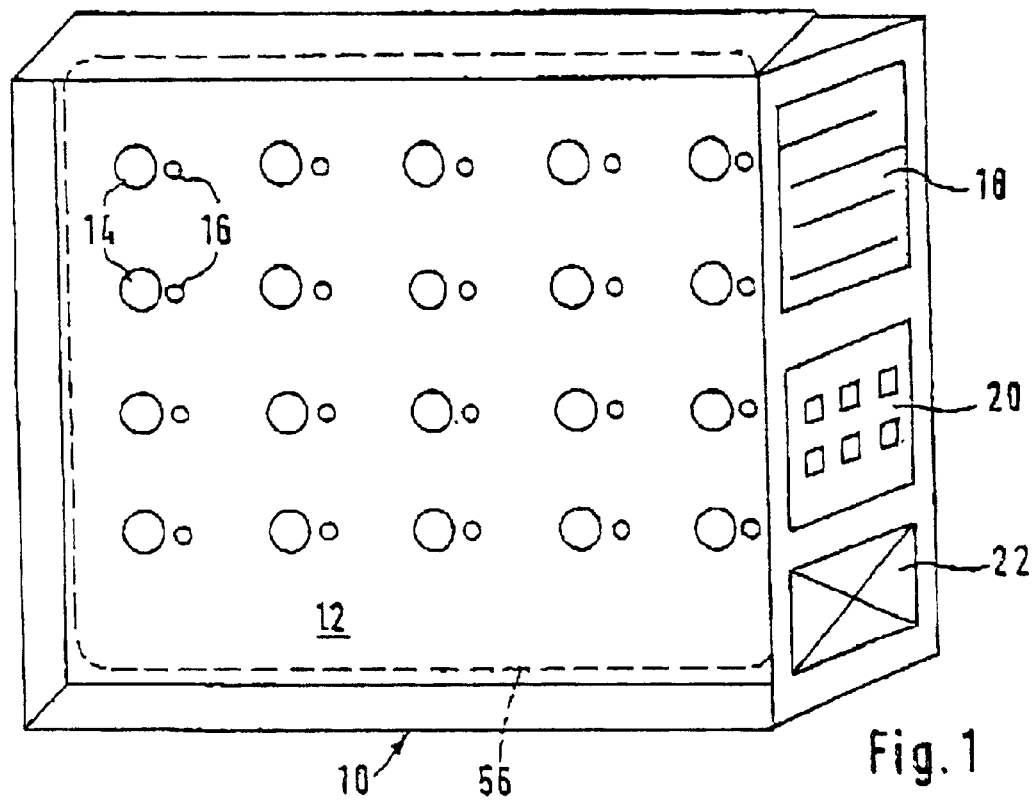
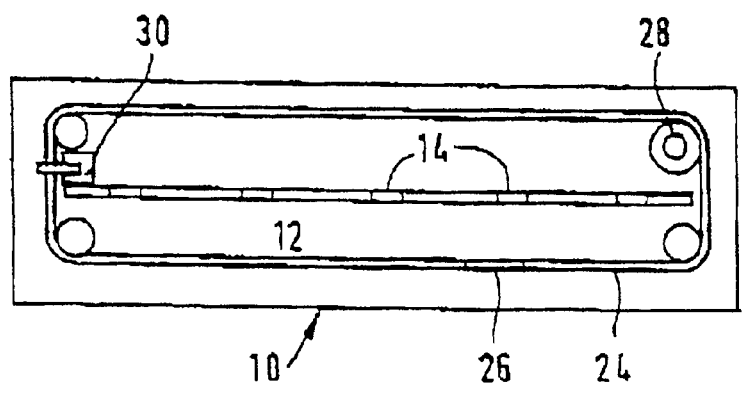
Fig. 1
Fig. 2

SYSTEM FOR STORAGE AND OUTPUT OF OBJECTS

BACKGROUND OF THE INVENTION

1. Field of the Invention

This invention relates to a system for the storage and output of objects such as keys which carry electronically stored identity information.

2. The Prior Art

The prior art has shown a generic system such as in U.S. Pat. No. 6,131,808. This system includes a storage container in the form of a cupboard closeable by a hinged door. Behind the door is a matrix with insertion locations for the objects. The objects themselves are constructed as wafers with identification circuits which can be connected to connections for a reading device via contacts in the inserted position. The wafers possess recesses for a click-stop apparatus for the insertion locations.

Furthermore, the storage container has a display device for the presence, position, or absence of the objects and an output device for releasing the door and releasing the insertion locations for removal of the objects.

SUMMARY OF THE INVENTION

The objects can be constructed as key tags for the non-detachable securing of keys. The system described is only suitable for the identification of objects when these are located in one of the insertion locations.

One object of the invention is to provide a system for the identification, localization, storage and output of objects, which can be used flexibly and is not sensitive to wear and contamination during the identification of objects.

In the system according to the invention, the exchange of electronically stored identity information with the reading device takes place free of contact or wirelessly via a transponder. The design results in a simpler handling and a more flexible range of applications, because identification is thereby fundamentally possible regardless of the position and distance of the transponder from the reading device. A wireless readout is also possible when the object is contaminated and is not subject to any mechanical wear of the contacts.

Thus, the objects can be better secured against unauthorized access. It is possible, via a sliding door to have selective restricted access to the released objects so that the removal of objects which have not been released is made substantially more difficult. In addition, it is also possible to operate the sliding door or blind using a motor and thus to automatically open and close it.

The display device can also have a display matrix comprising signal lamps or light-emitting diodes, allocated to the insertion locations of the objects. These lights display locations of any missing or desired objects and also light a separate display field for the insertion locations of the local storage container and/or additional remote storage containers.

The objects of interest can be identified more quickly, by using the display matrix especially when there is a large number of insertion locations, whereby handling is made easier to oversee, especially for highly frequented storage containers.

As a result of the additional display field, it is also possible to have central monitoring for remote storage containers.

Alternatively, the storage container can comprise a throw-in apparatus for objects and at least one manually inaccessible storage compartment. The storage compartment allow the objects to be automatically removed and selectively output according to identity information by means of the output device.

This variant presents additional security against manipulation since objects can only be output to authorized persons.

The reading device can have an evaluation apparatus which records and outputs or stores one or several states and properties of the objects such as presence, absence, insertion location number, storage container number, local field of application, access authorization, time of removal and return, duration of removal, allocation to user.

Depending on the field of application, it is possible to avoid or at least recognize manipulations or misplacements and thus provide a maximum degree of security despite user-friendly handling.

In addition, the reading device can also comprise a writing device and the transponder can have a storage device which can be written wirelessly from the writing device. In this case one or several of the states, authorizations and properties can be written in.

This design allows additional records to be kept, and thus offers a possibility for monitoring to protect against theft. The transponders can also be evaluated at other reading devices without it being necessary to continuously update data between reading devices.

The reading device can comprise a common antenna for the storage container. To distinguish the transponders, the data acquisition is accomplished via an anti-collision method. Thus, a plurality of objects with transponders can be monitored within the capture area of the antenna in the storage container.

The reading device can also comprise a separate antenna for each insertion location. In this embodiment, insertion locations can be specifically monitored.

In another embodiment, the same transponder is readable for mobile acquisition and/or identification at other mobile and/or stationary access systems via reading devices. This design simplifies the access to decentralized access systems so that it is only necessary to carry a single transponder with identity.

It is also possible to track the object. Thus, for example, any unauthorized removal of objects can be monitored and signaled. In addition, in decentralized access systems, it is also possible to jointly evaluate a mechanical key attached to the object and also the electronically stored identity information, to eliminate any misuse by mechanical copying of the key.

The object can be constructed as a pin with a hole at the free end and in the hole there is located an insert with a transponder. An antenna coil can be located in an outwardly projecting non-metallic head.

In this embodiment, the transponder can be mechanically protected, while the transponder can also transmit to the reading device largely uninfluenced by metal parts. In addition, the pin is also suitable for holding in an insertion location of a matrix in the storage container. Furthermore, the pin can have a locking slot.

The design allows the object to be secured in the matrix of a storage container against unauthorized removal. Furthermore, the object can be constructed as a tag for one or several items to be secured which is fixed to at least one appropriate item.

One or several items which themselves have no built-in transponder can be stored in a secured storage container, released in controlled fashion, and also tracked. In addition, the items can also be checked for proof of identity at remote locations and thus secured against misuse.

In another development, the non-detachable connection of the object to the item can be monitored and if disturbed, a property of the transponder can be changed.

With this design any theft or movement of objects or items is identified. The identification is possible because the item must be forcibly removed from the object with the transponder and the object is returned to the storage container alone to cover up this theft or movement.

In addition, the object can be constructed as a mobile container for securing one or several items when the items are transported.

In this design, the items located in the mobile container can be tracked jointly via the transponder of the mobile container. If the mobile container itself does not present any shielding, and the items located therein are objects provided for their part with transponders, it is also possible to individually identify the object inside the mobile container.

It is also possible to have localization, outside the container via several reading devices networked together in local areas. These reading devices search out or leave the objects after removal from the storage container.

With this design, it is also possible to monitor and if necessary locate the items in a larger region, such as a building. The items must not be removed. However, if they are removed, an alarm should be triggered.

Additionally, the transponders can be active transponders with their own power supply. The local region for monitoring can thus be enlarged substantially.

With active transponders data acquisition can be accomplished via an anti-collision method to distinguish between transponders. Since active transponders have a larger range than passive ones, the danger of collisions during data transmission is large even with a low local density of transponders. This danger can be eliminated by an anti-collision method.

The objects to be traced can be monitored via transponders in local zones where the entire area is covered globally or the accesses with cupboards are covered and in the event of an unauthorized leaving, an alarm is triggered.

BRIEF DESCRIPTION OF THE DRAWINGS

Other objects and features of the present invention will become apparent from the following detailed description considered in connection with the accompanying drawings. It is to be understood, however, that the drawings are designed as an illustration only not as a definition of the limits of the invention.

In the drawings, wherein similar reference characters denote similar elements throughout the several views:

FIG. 1 is a view of a storage without a door;

FIG. 2 is a cross-section through a storage container with a blind;

DETAILED DESCRIPTION OF THE PREFERRED EMBODIMENT

Figure 3:
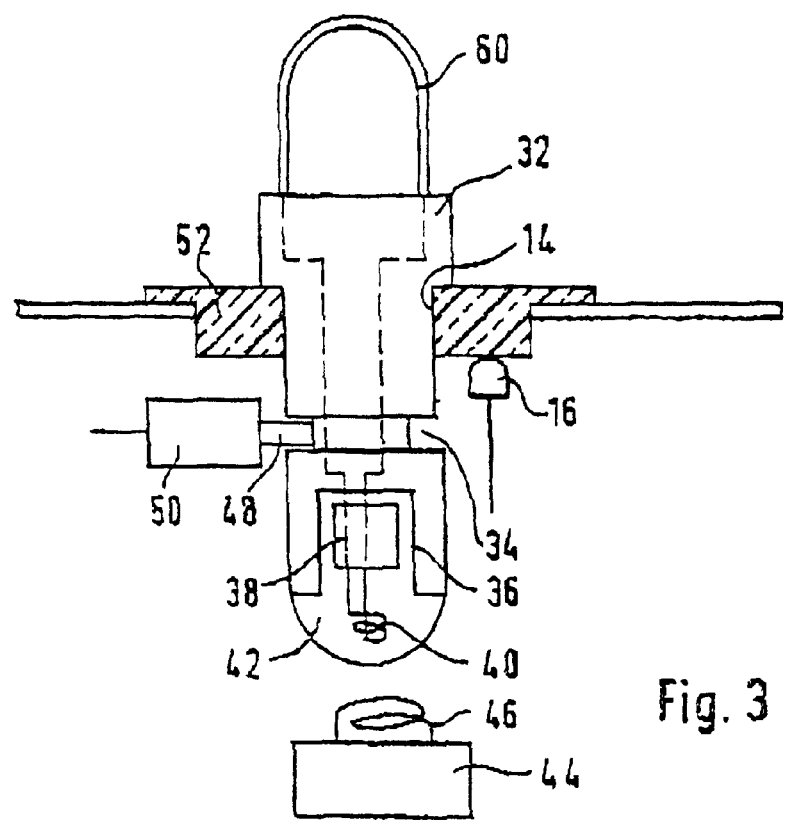
FIG. 3 is a schematic diagram of an object in the form of a pin located in an insertion location of a storage container.

Referring to the drawings, FIG. 1 shows a storage container 10 in the form of a cupboard having insertion locations 14 for objects 32 which are arranged in a matrix 12. Insertion locations 14 are cylindrically shaped and each comprise an optical display 16 via signal lamps or light-emitting diodes (LED) assigned to the insertion location. These lamps (LEDs) form a display matrix analogous to the matrix of insertion locations. On the outside of the container, there is a display field 18 and a keypad 20 which functions as an unlocking device. Display field 18 allows viewing of object-related data such as missing objects, times of removal and return, as well as positions of the sought objects. If there are several remote storage containers, the data can also be remotely interrogated there. In addition, the required objects can be released and then removed manually via an unlocking mechanism such as a keypad 20.

In addition, next to input keypad 20 there is also an antenna 22 of a reading device wherein a user can identify himself via a badge with identify information. It is also possible to log in an object 32 to be returned, assign a suitable insertion location 14 and then check whether the inserted object may be stored in the ultimately manually selected insertion location.

Alternatively, via an optional antenna 56, jointly covering all the insertion locations, the data of objects with transponders can be evaluated jointly via reading device 44 (See FIG. 2) using an anti-collision method. This device also applies to tracking the removal and/or return of objects.

As shown in FIG. 2 there is a blind 24 disposed in front of matrix 12. Blind 24 which can be moved or controlled by a drive unit 28 and can be locked via a locking device 30. Blind 24 contains a slit 26 which allows only one column of matrix 12 with objects 32 to be released at one time. Additionally, it is also possible to provide another blind in another coordinate direction so that by positioning the slits in the blind, only the particular insertion location of an object is accessible.

FIG. 3 shows an object 32 in the form of a pin in an insertion location 14 of a matrix. At its free end, the pin has a hole 36 in which an insert with a transponder 38 is located. There also is an antenna coil 40 disposed in a projecting non-metallic head 42. In the position shown, antenna coil 40 comes within the receiving range of a stationary reading coil 46 of a reading device 44.

The pin also has a circumferential locking slot 34 which can be engaged by a bolt 48 of the storage container 10. This bolt 48 can be unlocked electro-magnetically via electro-magnetic drive 50. Also shown is an optical signal transmitter in the form of an LED 16 which is visible on the outside through a transparent disk 52 and signals a certain state.

A non-detachable lock 60 for an item to be secured is a component of the transponder system. This involves a signal line which is checked for intactness by a monitoring circuit of the transponder to record any forced disturbance of the lock. When there is any damage or disturbance of the lock, this can be reported by the transponder or determined by interruption of the transponder function.

Figure 4:
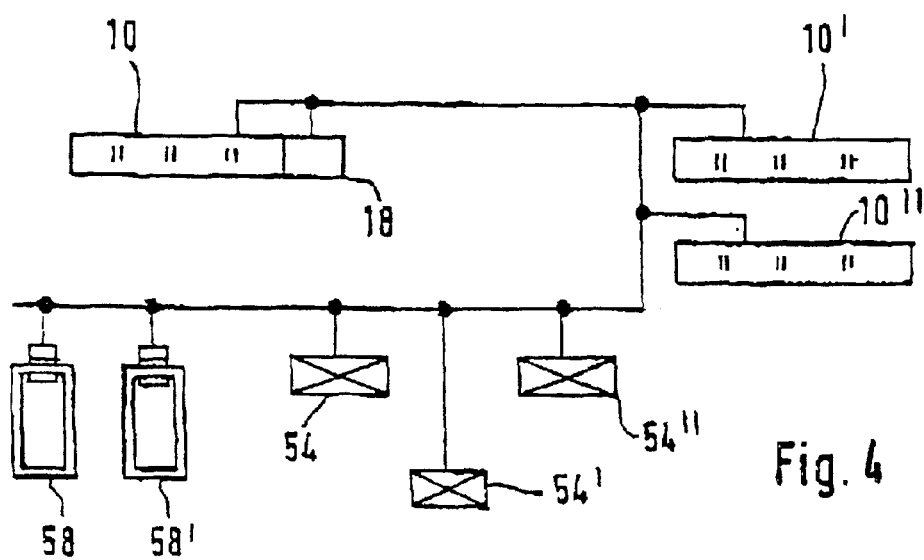
FIG. 4 is a block diagram of an object storage and tracking system.

FIG. 4 shows a system with several storage containers 10, 10', 10" and separate reading devices 54, 54', 54" which are connected one to the other via a data link or a data bus. It is also possible to achieve remote identification and local or global tracking of objects as well as storage in different storage containers. The storage positions of remote storage containers can also be displayed. Other control and release functions can also be controlled with the same transponders via other networked or self-contained reading devices.

Local zones can also be monitored via reading devices with frame antennae 58, 58' for larger ranges and active transponders where the entire area can be covered globally or the accesses with cupboards can be covered. In this case, it is possible to track objects according to whether they are located within a permitted region or have left a permitted region without permission which can be used to trigger an alarm.

Accordingly, while only a few embodiments of the present invention have been shown and described, it is obvious that many changes and modifications may be made thereunto without departing from the spirit and scope of the invention.

What is claimed is:

1. A system for identifying the location, storage and release of objects, having electrically stored identity information in a storage container, the system comprising:
   (a) at least one transponder associated with each object, said transponder for storing the identity information of the associated object;
   (b) at least one reading device for reading identity information from each of said at least one transponder;
   (c) at least one display device for displaying the present position or absence of the objects;
   (d) an antenna for receiving signals from an additional reading device for allowing a user to identify himself via a batch transmission with identity information;
   (e) a plurality of storage locations arranged in the storage container in the form of a matrix which are automatically lockable and releasable via said at least one unlocking device; and
   (f) at least one door that is slidable and lockable and disposed in the storage container in front of the matrix for selectively covering the objects; and
   (g) a drive for moving said at least one door into different positions so that the objects can be selectively inserted and removed manually from the matrix and are unlockable via access authorization.

2. The system according to claim 1, wherein said display device comprises a plurality of lights in a display matrix allocated to the insertion locations of the objects, comprises a signal for the selective display of missing or desired objects and creates a separate display field which indicate insertion locations on a local storage container.

3. The system according to claim 1, wherein said reading device comprises an evaluation device which records, and outputs, and stores one or more states and properties of the objects such as presence, absence, insertion location number, storage container number, local range of application, access authorization, time or duration of access authorization, time of removal and return, duration of removal and assignment of user.

4. The system according to claim 3, wherein the reading device also comprises a writing device and wherein said at least one transponder has a storage device which can write authorizations and properties wirelessly via the writing device, via one or more states.

5. The system according to claim 1, wherein the reading device comprises a common antenna for the storage container wherein to distinguish one or more of said at least one transponder, data acquisition occurs via an anti-collision method.

6. The system according to claim 1, wherein said at least one device for each insertion location comprises a separate antenna.

7. The system according to claim 1 wherein said at least one transponder is readable or combinable with other systems for mobile acquisition and/or identification at other mobile and/or stationary access systems or for control of other systems via said at least one reading device.

8. The system according to claim 1 wherein the object is a pin with a hole at a free end and in the hole is disposed an insert with at least one transponder, wherein an antenna coil is arranged in an outward-projecting non-metallic head of said at least one transponder.

9. The system according to claim 8, wherein the pin has a locking slot.

10. The system according to claim 1, wherein the object is a tag for an item to be secured, which is fixed to at least one relevant item.

11. The system according to claim 10, wherein the non-detachable connection of the object to the item to be secured is monitored, and if this is disturbed, a property of said at least one transponder is changed.

12. The system according to claim 1, wherein the display device is constructed as a mobile container for one or more items to be secured.

13. The system according to claim 1, further comprising several additional reading devices in a network which identify local regions outside the storage container which the objects seek out or leave after removal from a storage container.

14. The system according to claim 13, wherein said at least one transponder is an active transponder with its own power supply.

15. The system according to claim 14, wherein each of said at least one transponder acquires data via an anti-collision method to distinguish the transponders.

16. The system according to claim 1, wherein said at least one transponder monitors objects in local zones wherein total area is covered globally or accesses with cupboards are covered and an alarm is triggered in an event of unauthorized leaving.

17. The system as in claim 1, wherein said door has at least one slit for exposing the objects in the matrix.

18. A system for identifying the location, storage and release of objects, having electrically stored identity information in a storage container, the system comprising:
   (a) at least one transponder associated with each other, said transponder for storing the identity information of the object
   (b) at least one reading device for reading identity information;
   (c) at least one display device for displaying the present position or absence of the objects;
   (d) an antenna for an additional reading device for allowing a user to identify himself via a batch with identity information;
   (e) a plurality of storage locations arranged in the storage container in the form of a matrix which are automatically lockable and releasable via said at least one unlocking device; and
   (f) at least one door that is slidable and lockable and disposed in said storage container in front of the matrix for selectively covering the objects, said door also having a slit for selectively exposing a selected object; and
   (g) a drive for moving said at least one door parallel to said matrix into different positions so that the objects; can be selectively inserted and removed manually from the matrix when said slit exposes the objects wherein the objects can then be unlocked via access authorization.

* * * * *

UNITED STATES PATENT AND TRADEMARK OFFICE
CERTIFICATE OF CORRECTION

PATENT NO. : 6,827,256 B2
DATED : December 7, 2004
INVENTOR(S) : Stobbe

It is certified that error appears in the above-identified patent and that said Letters Patent is hereby corrected as shown below:

Column 6,
Line 41, after the word "each" please change "other" to correctly read -- object --.

Signed and Sealed this

Twentieth Day of September, 2005

JON W. DUDAS
*Director of the United States Patent and Trademark Office*